United States Patent [19]
Yoshida et al.

[11] Patent Number: 5,285,233
[45] Date of Patent: Feb. 8, 1994

[54] EXTRINSIC LIGHT ELIMINATOR FOR AUTOFOCUSING CIRCUIT

[75] Inventors: Hideo Yoshida; Minoru Ishiguro, both of Ohmiya, Japan

[73] Assignee: Fuji Photo Optical Co., Ltd., Ohmiya, Japan

[21] Appl. No.: 957,617

[22] Filed: Oct. 6, 1992

[30] Foreign Application Priority Data

Oct. 9, 1991 [JP] Japan ................................. 3-290874
Oct. 9, 1991 [JP] Japan ................................. 3-290875
Oct. 9, 1991 [JP] Japan ................................. 3-290877

[51] Int. Cl.$^5$ ............................................. G03B 13/36
[52] U.S. Cl. .................................. 354/403; 250/201.4
[58] Field of Search ................ 354/403; 356/1, 4; 250/201.4, 201.6

[56] References Cited

U.S. PATENT DOCUMENTS 4,678,323  7/1987  Sato et al. ............................ 354/403
5,189,461  2/1993  Ishiguro ............................... 354/402

OTHER PUBLICATIONS

U.S. Patent application Ser. No. 07/834,636, filed Feb. 12, 1992, entitled Range Finder for Passive Type Autofocussing Device.

*Primary Examiner*—W. B. Perkey
*Attorney, Agent, or Firm*—Price, Heneveld, Cooper, DeWitt & Litton

[57] ABSTRACT

An autofocusing circuit includes an extrinsic light eliminator including a light emitter such as an infrared emitting diode for projecting a signal light reflected by an object to be photographed and detected by a photodetector to determine the distance to the object. A chopper integrating circuit to convert the photocurrent from the detector to a corresponding voltage and simultaneously amplifies this voltage. In a preferred embodiment, the operating period of the chopper integrating circuit is set to 0.025 sec. multiplied by an integer in order to assure that any extrinsic light components derived from a commercial power supply is reliably eliminated from the detected photocurrent no matter whether the commercial power supply is of 50 Hz or 60 Hz.

8 Claims, 9 Drawing Sheets

EXTRINSIC LIGHT ELIMINATOR FOR AUTOFOCUSING CIRCUIT

FIELD OF THE INVENTION

This invention generally relates to an autofocusing device, particularly to an autofocusing device of an active type comprising a light emitter and a photodetector both provided in a photographic camera so that signal light projected from the light emitter and reflected on an object to be photographed is detected by the photodetector to determine a distance to the object and, more particularly, to extrinsic light eliminator means incorporated in such autofocusing device in order to eliminate an influence of extrinsic light which otherwise might be detected by the photodetector together with the light reflected on the object.

BACKGROUND OF THE INVENTION

Photographing sometimes takes place utilizing a strobe flash, but in most cases objects to be photographed are irradiated with the sunlight under the open sky. The luminance of sunlight is too intense compared with those of the other various light sources and would saturate an amplifier if it is directly input to a rangefinder circuit, making it impossible to obtain data necessary for range-finding. To overcome such inconvenience, a high pass filter has conventionally been used to eliminate monotonous luminance such as that of the sunlight. However, this countermeasure disadvantageously requires a high pass filter for each amplifier and consequently makes the relevant circuit arrangement correspondingly bulky.

FIG. 9 in the attached drawings is a block diagram illustrating the extrinsic light eliminator of the prior art, in which an infrared emitting diode (IRED) is used as the light emitter 1 and signal light projected, then reflected on the object is detected by the photodetector 2 as the corresponding photocurrent. This photocurrent is converted to the corresponding voltage and simultaneously DC component and/or low frequency component possibly accompanying the photocurrent is eliminated in a current/voltage converting amplifier 3. The voltage thus processed is amplified by a gain circuit 4, then held and further amplified by a hold circuit 5. The voltage held by the hold circuit 5 is amplified again and integrated by an integrating circuit 6. A comparator 7 compares the integrated voltage with a reference voltage and, when the integrated voltage exceeds the reference voltage, applies IRED drive terminating signal to a CpU 8. With this signal, IRED drive circuit 9 and therefore the light emitter 1 are disabled.

However, with this extrinsic light eliminator of the prior art as has been mentioned above, the low frequency component or the other undesirable components cannot be adequately eliminated and the relevant circuit arrangement remains bulky.

FIG. 10 exemplarily illustrates the extrinsic light eliminator of the prior art and FIG. 11 shows its frequency characteristic. As will be apparent from FIG. 11, the DC component is not adequately eliminated. FIG. 12 is a diagram of input/output waveforms exhibited by the conventional extrinsic light eliminator, showing (a) the input current waveform derived from a signal light which is projected from the light emitter, then reflected on the object irradiated with rays coming from a tungsten filament lamp and detected by the photodetector as the corresponding photocurrent and (b) the output voltage waveform from which the extrinsic light components have been eliminated by the current/voltage converting amplifier, respectively. The input current waveform detected by the photodetector 2 consists of the extrinsic light component waveform 2a and the signal component waveform superimposed thereupon and as indicated by FIG. 12(b), the low frequency component 2b corresponding to the extrinsic light component derived from the tungsten filament lamp is imperfectly eliminated.

Such residual low frequency component 2b remains until it is processed by the integrating circuit 6 and, in a disadvantageous consequence, the data required to determine a distance to the object necessarily contains an indeterminate factor resulting in a low reliability.

In view of such situation, it is a principal object of this invention to provide an extrinsic light eliminator for an autofocusing circuit so improved that rangefinding data of high reliability can be obtained by eliminating the extrinsic light components as perfectly as possible and the circuit arrangement can be simplified by minimizing the number of parts.

SUMMARY OF THE INVENTION

To achieve the object set forth above, this invention resides in an extrinsic light eliminator for an autofocusing circuit comprising a combination of the autofocusing circuit proper in which a signal light projected from a light emitter, then reflected on an object to be photographed is detected by a photodetector as the corresponding photocurrent and thereby a distance to the object is determined, and extrinsic light eliminator means comprising a chopper integrating circuit incorporated in the autofocusing circuit, which is adapted to convert the photocurrent to the corresponding voltage and to amplify this voltage before it is output therefrom Preferably, an operating period of the chopper integrating circuit is set to 0.025 sec. multiplied by an integer. More preferably, the operating period of the chopper integrating circuit is set to 1/240 sec. multiplied by an integer.

According to another aspect of the invention, the extrinsic light eliminator for an autofocusing circuit further comprises a hold circuit to hold the output voltage of the chopper integrating circuit, a capacitance serving both as an integrating capacitance for the chopper integrating circuit and as a voltage holding capacitance for the hold circuit, and a change-over switch adapted to change over the function of the common capacitance so that the common capacitance serves as the integrating capacitance during integrating operation of the chopper integrating circuit and, upon completion of this integrating operation, serves as the voltage holding capacitance for the hold circuit.

Preferably, there is provided in a feedback loop of the hold circuit a load switch equivalent to the change-over switch, which is normally closed so long as the autofocusing circuit is operating.

DESCRIPTION OF THE PREFERRED EMBODIMENT

The extrinsic light eliminator for autofocusing circuit constructed in accordance with this invention will be described more in detail by way of example in reference to the attached drawings.

Figure 1:
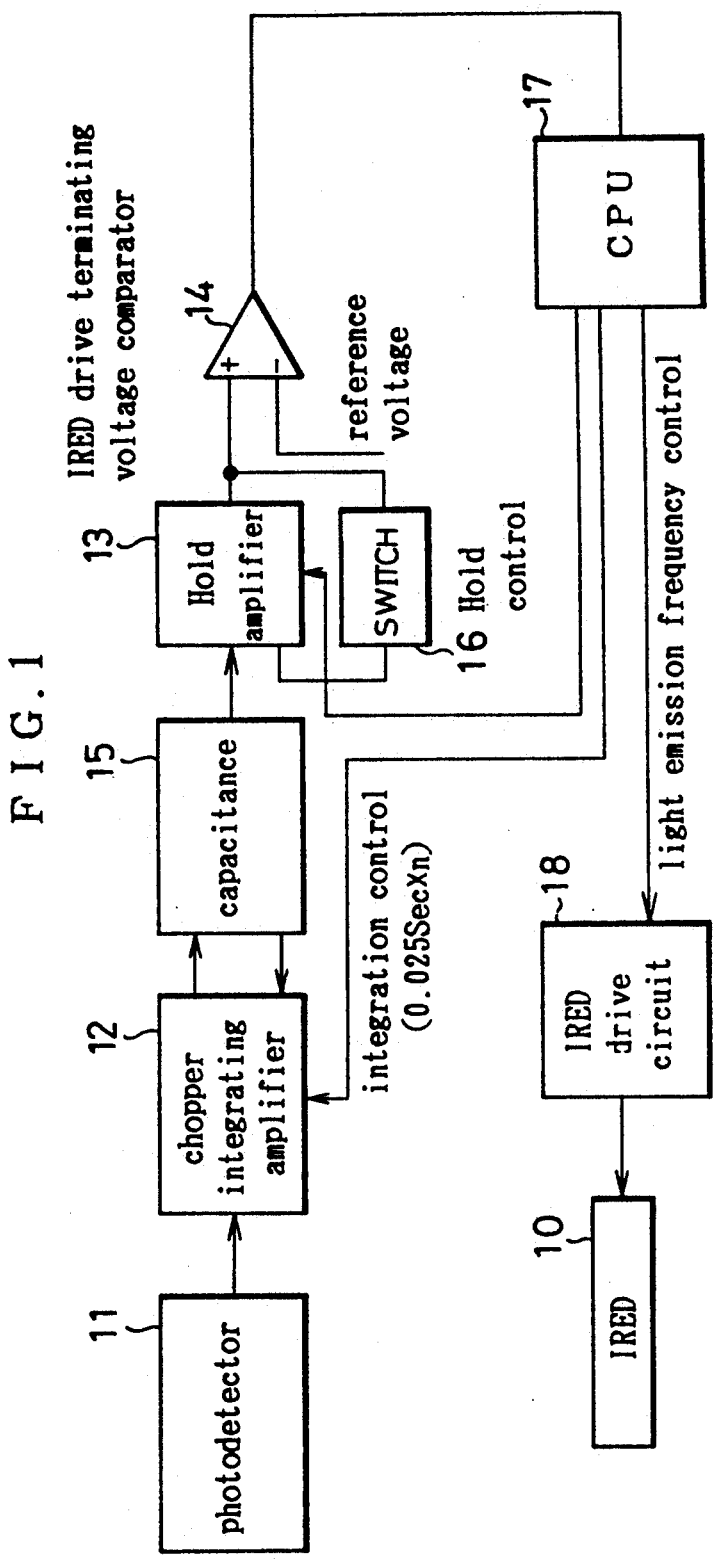
FIG. 1 is a block diagram of an autofocusing circuit provided with an extrinsic light eliminator.

Referring to FIG. 1 showing, in a block diagram, the autofocusing circuit incorporated with such extrinsic light eliminator, in which infrared rays serving as signal light are projected from a light emitter 10 comprising an infrared emitting diode (IRED) to an object to be photographed and the signal light reflected on the object is detected as the corresponding photocurrent by a photodetector 11 comprising, for example, a photodiode.

The photocurrent thus detected by the photodetector 11 is input to a chopper integrating circuit 12 serving as the extrinsic light eliminator in which the photocurrent is converted to the corresponding voltage and simultaneously amplified before it is output therefrom. The voltage output from the chopper integrating circuit 12 is held by a hold circuit 13 and then applied to a comparator 14. There is provided a capacitor 15 serving both as an integrating capacitance for the chopper integrating circuit 12 and as a voltage holding capacitance for the hold circuit 13 so that the capacitor 15 serves exclusively as the voltage holding capacitance for the hold circuit 13 upon completion of chopper integration.

The output from the hold circuit 13 is fed back via a normally closed load switch 16 and compared to a reference voltage on the input side of comparator 14.

The comparator 14 compares the voltage held by the hold circuit 13 with the reference voltage and, when the voltage held by the hold circuit 13 exceeds the reference voltage, applies an IRED drive terminating signal to a CPU 17 serving to control the autofocusing circuit. Upon reception of this signal, the CPU 17 applies an IRED disabling signal to an IRED drive circuit 18, causing the light emitter lo to be deenergized.

In addition to the above-mentioned IRED disabling signal applied to the IRED drive circuit 18, the CPU 17 applies an integration control signal to the chopper integrating circuit 12 and a hold control signal to the hold circuit 13. Additionally, the CpU 17 applies the IRED drive circuit 18 with a light emission frequency control signal for the light emitter 10.

Figure 4:
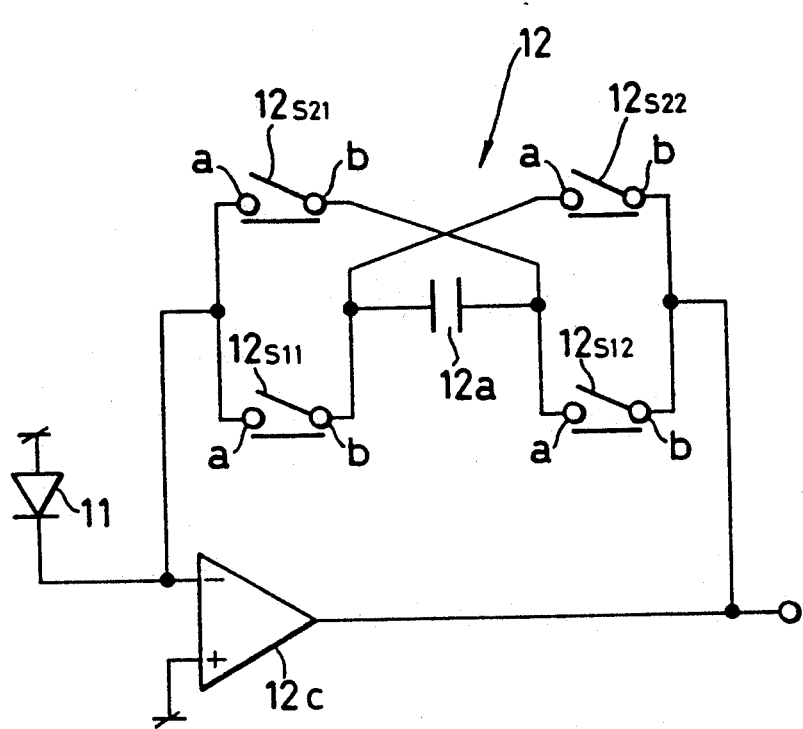
FIG. 4 is a schematic circuit diagram of a chopper integrating circuit serving as the extrinsic light eliminator.
Figure 5:
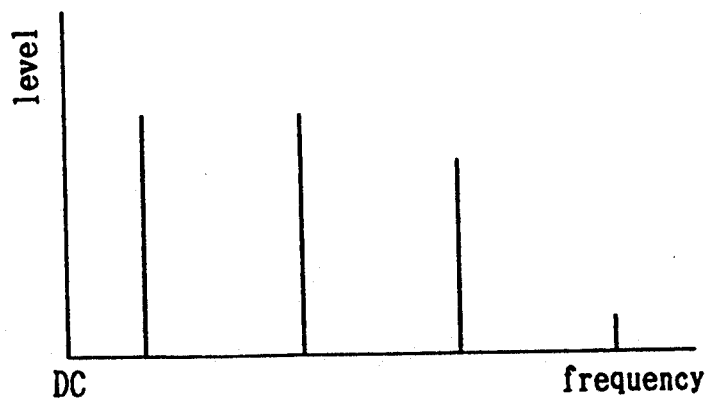
FIG. 5 is a graphic diagram showing the frequency characteristic of the chopper integrating circuit serving as the extrinsic light eliminator.

Referring to FIG. 4, the chopper integrating circuit 12 includes a capacitor 12a having opposite terminals to which two paired switches $12_{s1}$, $12_{s2}$ are connected, respectively. These paired switches $12_{s1}$, $12_{s2}$ respectively comprise switches $12_{s11}$, $12_{s12}$ and switches $12_{s21}$, $12_{s22}$. One terminal a of the switch $12_{s11}$ and one terminal a of the switch $12_{s21}$ are connected to a cathode of the photodetector 11 and this cathode is connected to a negative input terminal of an operational amplifier 12c. The other terminal b of the switch $12_{s11}$ is connected to one terminal a of the switch $12_{s22}$ and an intermediate point thereof is connected to one terminal of the capacitor 12a. The other terminal b of the switch $12_{s21}$ is connected to one terminal a of the switch $12_{s12}$ and an intermediate point thereof is connected to the other terminal of the capacitor 12a. The respective other terminals b of the switches $12_{s12}$ and $12_{s22}$ are connected to an output terminal of the operational amplifier 12c. These and other switches shown are of course solid state switches conventionally controlled by signals from the CPU 17. This chopper integrating circuit 12 exhibits a frequency characteristic as graphically shown by FIG. 5 and passes only a distorted component occurring as the chopper frequency reaches a predetermined value.

Figure 6:
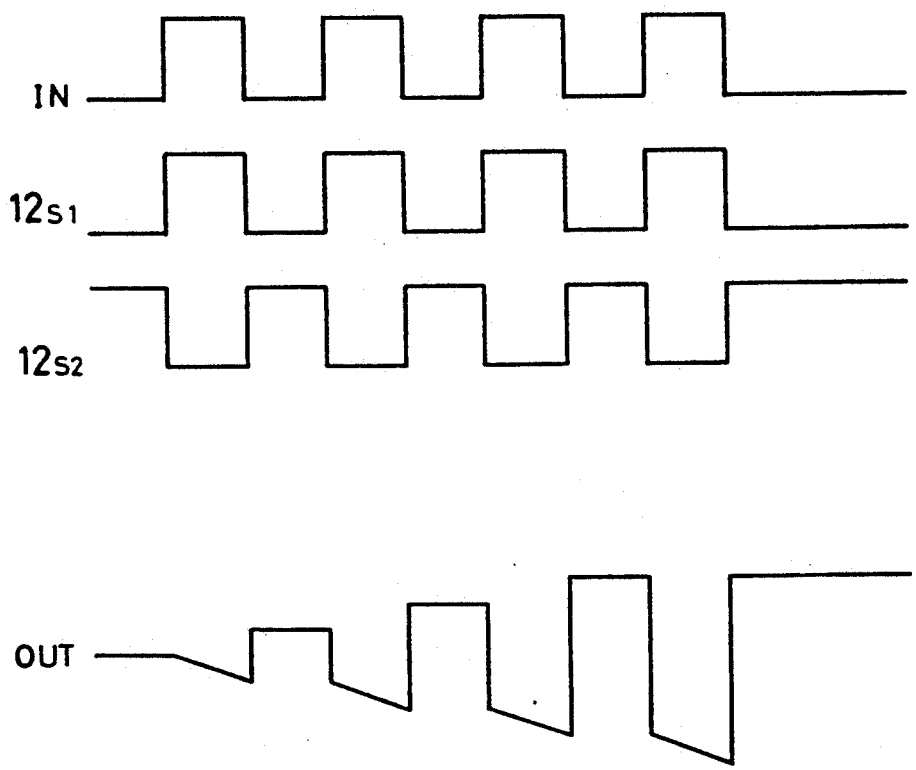
FIG. 6 is a voltage waveform time chart sequentially illustrating the operation of the chopper integrating circuit serving as the extrinsic light eliminator.

Referring now to FIG. 6 illustrating, in a time chart, operation of the chopper integrating circuit 12, ON-OFF change-over of the respective paired switches $12_{s1}$, $12_{s2}$ occurs synchronously with an input pulse IN of the photocurrent detected by the photodetector 11, i.e. a radiant pulse provided from the light emitter 10 and thereby generates an output pulse OUT as illustrated.

Figure 2:
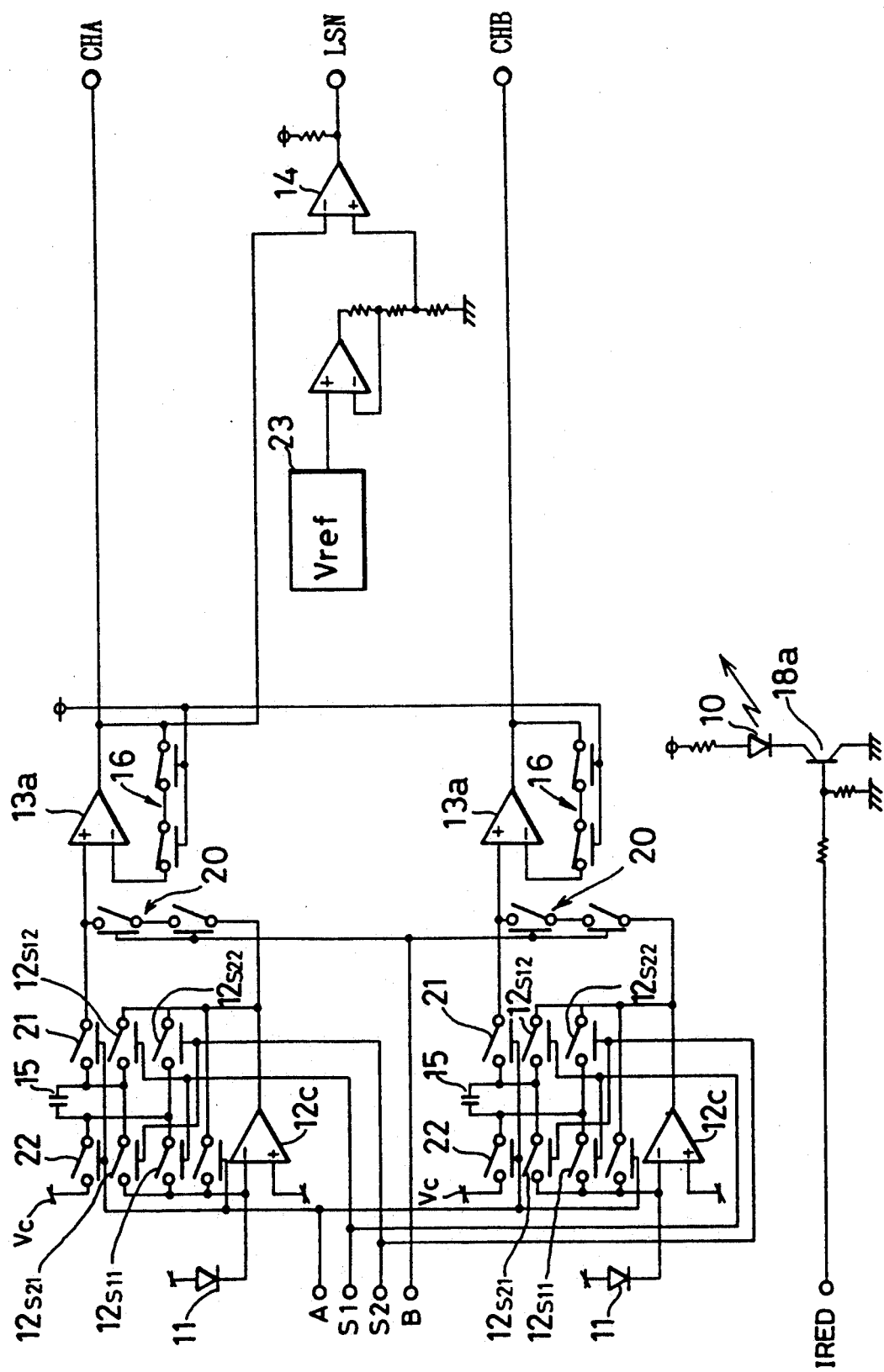
FIG. 2 is a schematic circuit diagram of the autofocusing circuit provided with the extrinsic light eliminator.

Referring now to FIG. 2 showing the autofocusing circuit including the chopper integrating circuit 12, the light emitter 10 is activated to emit IR rays as a switching transistor 18a is turned ON-OFF in response to the light emission frequency control signal provided from the CPU 17. The signal light emitted from the light emitter 10 and then reflected on an object to be photographed (not shown) is detected by the photodetector 11 as the corresponding photocurrent. The photodetector 11 is connected to the negative input terminal of the operational amplifier 12c, on one side, and to the one terminals of the respective switches $12_{s11}$, $12_{s21}$, on the other side. The other terminal of the switch $12_{s11}$ is connected to the capacitor 15 (equivalent to the capacitor 12a in FIG. 4), on one side, and to the one terminal of the switch $12_{s22}$, on the other side. The other terminal of the switch $12_{s21}$ is connected to the other terminal of the capacitor 15, on one side, and to the one terminal of the switch $12_{s21}$, on the other side. The other terminals of the respective switches 12$_{s12}$, 12$_{s22}$ are connected to the output terminal of the operational amplifier 12c.

The output terminal of the operational amplifier 12c is serially connected to one terminal of a change-over switch 20 of which the other terminal is connected to a positive input terminal of the operational amplifier 12c constituting the hold circuit 13. The positive input terminal is connected by a switch 21 to the other terminal of the capacitor 15 and reference voltage Vc is coupled to the one terminal of the capacitor 15 via a switch 22. It should be understood that a resistance value of the switches 21, 22 is preset to be equal to a resistance value of the change-over switch 20. Output of the operational amplifier 13a is fed back to the negative input terminal via the normally closed load switch 16. This load switch 16 has a resistance value preset to be equal to the resistance value of the change-over switch 20. The switches 12$_{s11}$, 12$_{s12}$ are controlled to be opened or closed with a control signal applied to a terminal S1, the switches 12$_{s21}$, 12$_{s22}$ are controlled to be opened or closed with a control signal applied to a terminal S2, the change-over switch 20 is controlled to be opened or closed with a control signal applied to a terminal B, and the switches 21, 22 are controlled to be opened or closed with a control signal applied to a terminal A.

The output terminal of the operational amplifier 13a is connected to a negative input terminal of the comparator 14 having its positive input terminal adapted to be applied with comparison reference voltage from a constant-voltage regulated power supply 23.

The extrinsic light eliminator for the autofocusing circuit as constructed according to this invention operates in a manner as will be described.

Upon depression of a release button (not shown) on a camera, measurement of a distance to the object (not shown) is initiated prior to actual release and the light emitter 10 projects infrared rays as the signal light onto the object. The signal light then reflected on the object is detected by the photodetector 11.

Figure 7:
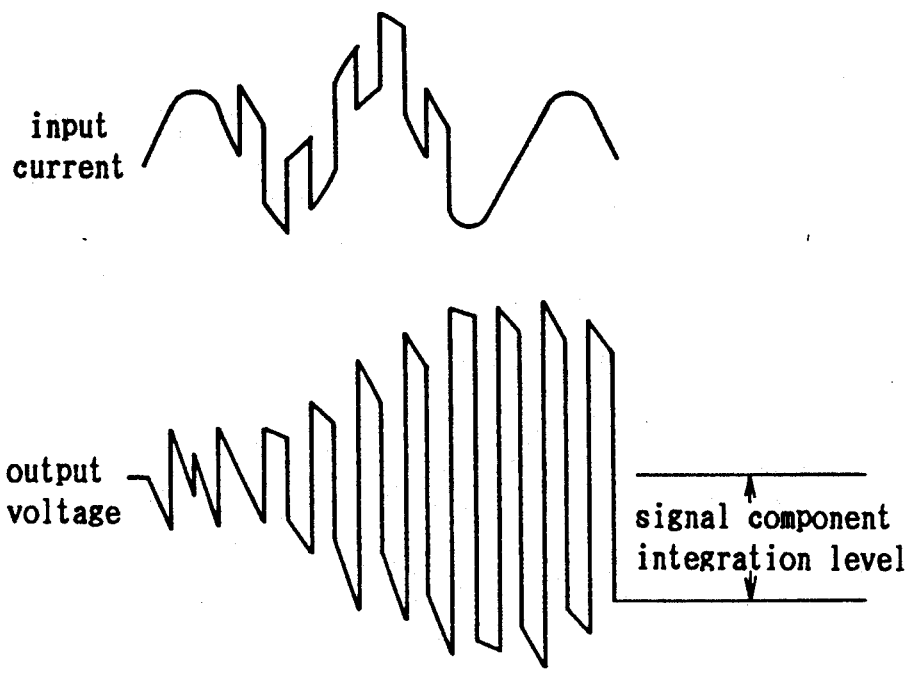
FIGS. 7(a) and 7(b) is a voltage waveform diagram showing input/output waveforms exhibited by the chopper integrating circuit serving as the extrinsic light eliminator, showing in FIG. 7(a) the case in which an object to be photographed is irradiated with extrinsic light and in FIG. 7(b) the case in which the object is irradiated with no extrinsic light, respectively.
Figure 7:
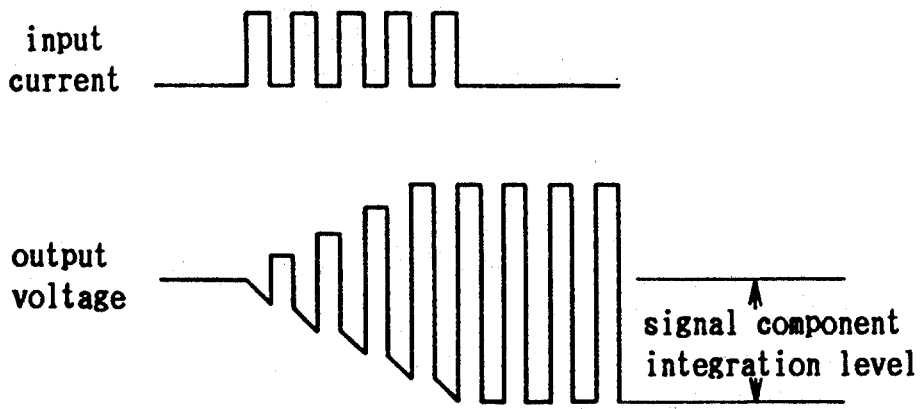

If the object is irradiated also with any extrinsic light, such extrinsic light also will be detected by the photodetector 11. When the object is under a lighting effect by a tungsten filament lamp, the photocurrent detected by the photodetector 11 presents an input current waveform as illustrated by FIG. 7(a) comprising a sinusoidal waveform corresponding to repeated bright and dark cycles of the tungsten filament lamp and a waveform of the signal light superimposed thereupon. The photocurrent of such composed waveform is input to the chopper integrating circuit 12, an ON signal is provided alternately from the terminals S1, S2 as shown in FIG. 2, whereupon the switches 12$_{s11}$, 12$_{s12}$ and the switches 12$_{s21}$, 12$_{s22}$ are alternately opened and closed synchronously with the signal light pulses emitted from the light emitter 10. The chopper integrating circuit 12 allows only the distorted components to pass therethrough so that the sinusoidal waveform corresponding to the bright and dark cycles of the tungsten filament lamp is eliminated and consequently only the voltage waveform corresponding to the signal light is output as will be apparent from the output voltage waveform of FIG. 7(a).

If there is no extrinsic light component, the signal light projected from the light emitter 10 and then reflected on the object is detected by the photodetector as an input current waveform as illustrated by FIG. 7(b) which is then passed through the chopper integrating circuit 12 and output therefrom in the form of an output voltage waveform as illustrated in the same Figure.

As will be readily understood by comparing the output voltage waveform of FIG. 7(a) with the output voltage waveform of FIG. 7(b), both the voltage signals will have their signal component integration levels equalized to each other once they have reached a steady state after passage through the chopper integrating circuit 12.

In order that the extrinsic light components can be reliably eliminated by guiding them through the chopper integrating circuit 12, operating period of the chopper integrating circuit 12 may be adjusted to 0.025 sec. multiplied by an integer according to a principle as will be described.

Figure 8:
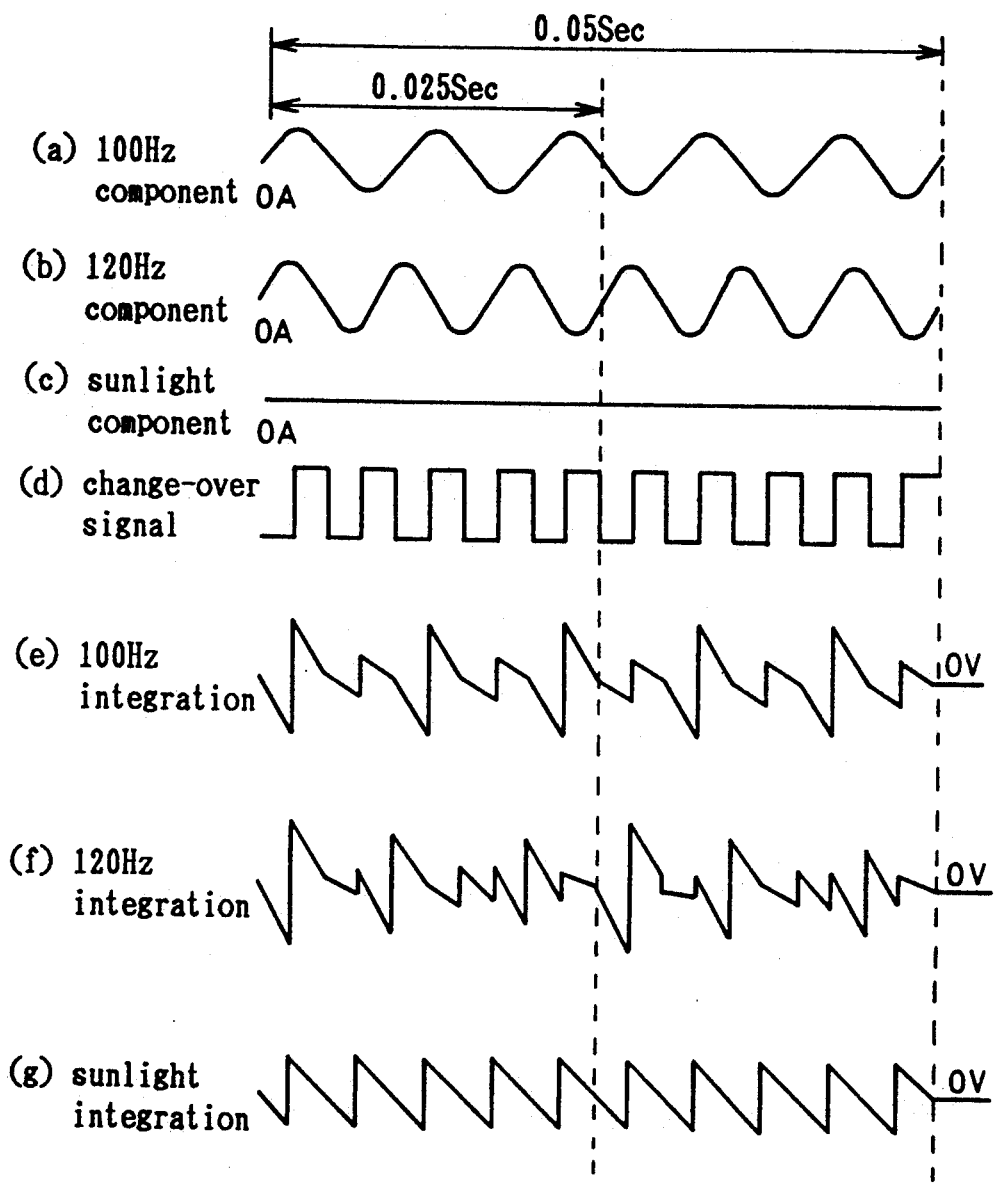
FIGS. 8(a)–8(g) is a voltage waveform time chart sequentially illustrating the operation of the autofocusing circuit provided with the chopper integrating circuit serving as the extrinsic light eliminator.
Figure 9:
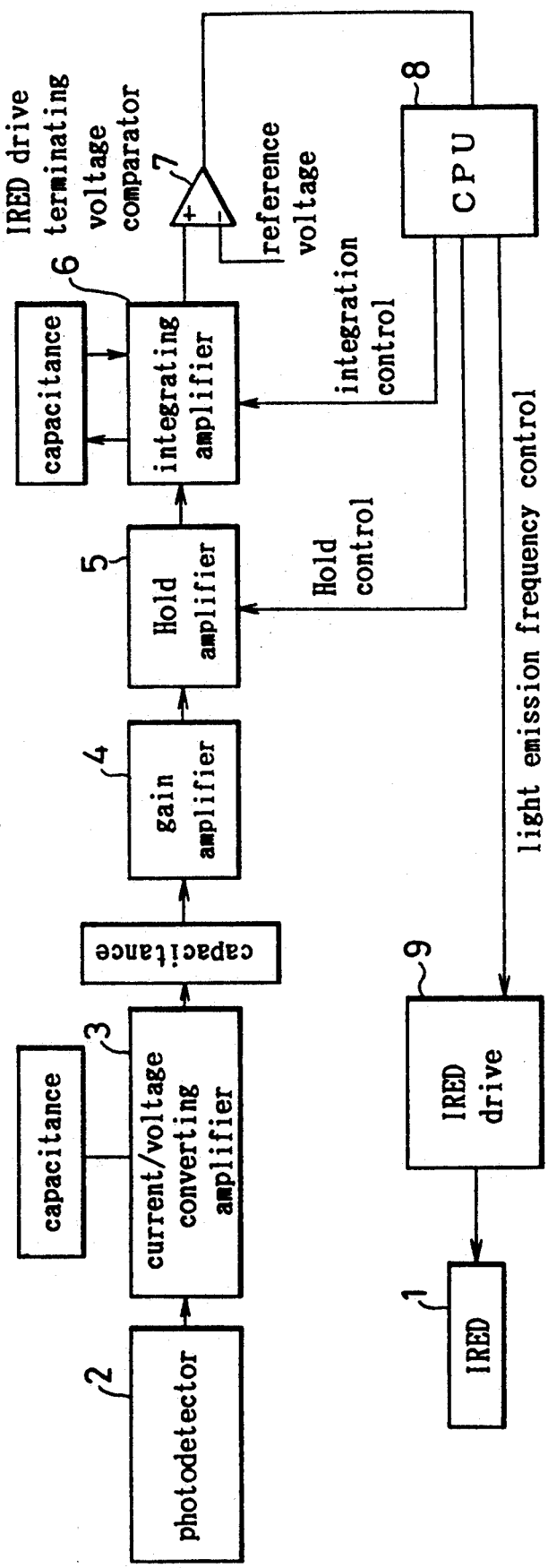
FIG. 9 is a block circuit diagram of the autofocusing circuit provided with an extrinsic light eliminator of well-known art.
Figure 10:
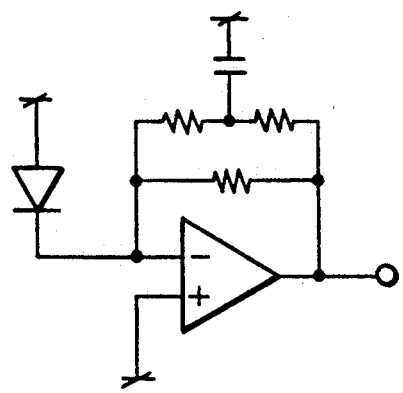
FIG. 10 is a schematic circuit diagram of a filter circuit usually employed as the extrinsic light eliminator of the prior art.
Figure 11:
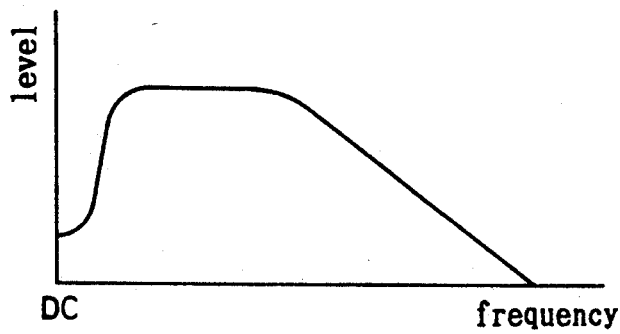
FIG. 11 is a voltage waveform graphic diagram showing a frequency characteristic of such convention extrinsic light eliminator.
Figure 12A:
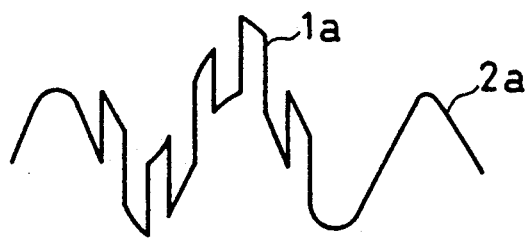
FIGS. 12(a) and 12(b) is a voltage waveform diagram showing input/output waveforms exhibited by the conventional extrinsic light eliminator, showing in FIG. 12(a) the input current waveform derived from a signal light which is projected by a light emitter, then reflected on the object irradiated with the light rays of a tungsten filament lamp and detected by a photodetector as the corresponding photocurrent and in FIG. 12(b) the output voltage waveform with the extrinsic light components having been eliminated by a current/voltage converting amplifier, respectively.
Figure 12B:

Commercial power supply is usually available at frequencies of 50 Hz and 60 Hz. With the tungsten filament lamp or the like energized by such commercial power supply, light emission occurs at each peak of the waveform at above-mentioned frequency, i.e., 50 Hz or 60 Hz, and therefore the corresponding photocurrent detected by the photodetector 11 will be of 100 Hz or 120 Hz as illustrated in FIG. 8(a) or 8(b), respectively. In order that such waveform components can be eliminated by integration, a time point at which the integration is terminated should coincide with the time point at which the integrated voltage waveform as illustrated by FIG. 8(e) or 8(f) becomes zero volts. Accordingly, if the integration is initiated at a point corresponding to the point at which the photocurrent crosses a central value thereof, the integration may be terminated at a point corresponding to the point at which the photocurrent crosses the next central value thereof. Specifically, the integrating operation may be performed over a period corresponding to ½ cycle of the photocurrent. To be adapted for the commercial power supply, a period T$_{50}$ of integrating operation must be $T_{50} = 1/200$ sec.

for the 50 Hz commercial power supply, and a period T$_{60}$ of integrating operation must be $T_{60} = 1/240$ sec.

for the 60 Hz commercial power supply. No matter which the commercial power supply may be, the extrinsic light components derived from the tungsten filament lamp or the like can be reliably eliminated by subjecting the signal voltage to the processing of integration for a period (30/1200 sec. = 1/40 sec.) corresponding to the least common multiple of the above-mentioned periods (1/200 sec.) and (1/240 sec.). More specifically, the least common multiple 1/40 = 0.025 sec. and, therefore, the chopper integrating circuit 12 may be operated for a period corresponding to this least common multiple multiplied by an integer, i.e., 0.025 * n sec.(n represents an integer) to assure that the extrinsic light components derived from either the 50 Hz commercial power supply or the 60 Hz commercial power supply are effectively eliminated. It should be understood that, for the object being irradiated with the sunlight, influence of the extrinsic light components due to it is negligible because of the photocurrent waveform derived from the sunlight can be considered to be substantially linear as illustrated by FIG. 8(c).

ON-OFF change-over period (i.e., chopper period) between the switches $12_{s11}$, $12_{s12}$ and the switches $12_{s21}$, $12_{s22}$ is set to 0.025 * 1/m sec.(m represents an integer).

Figure 3:
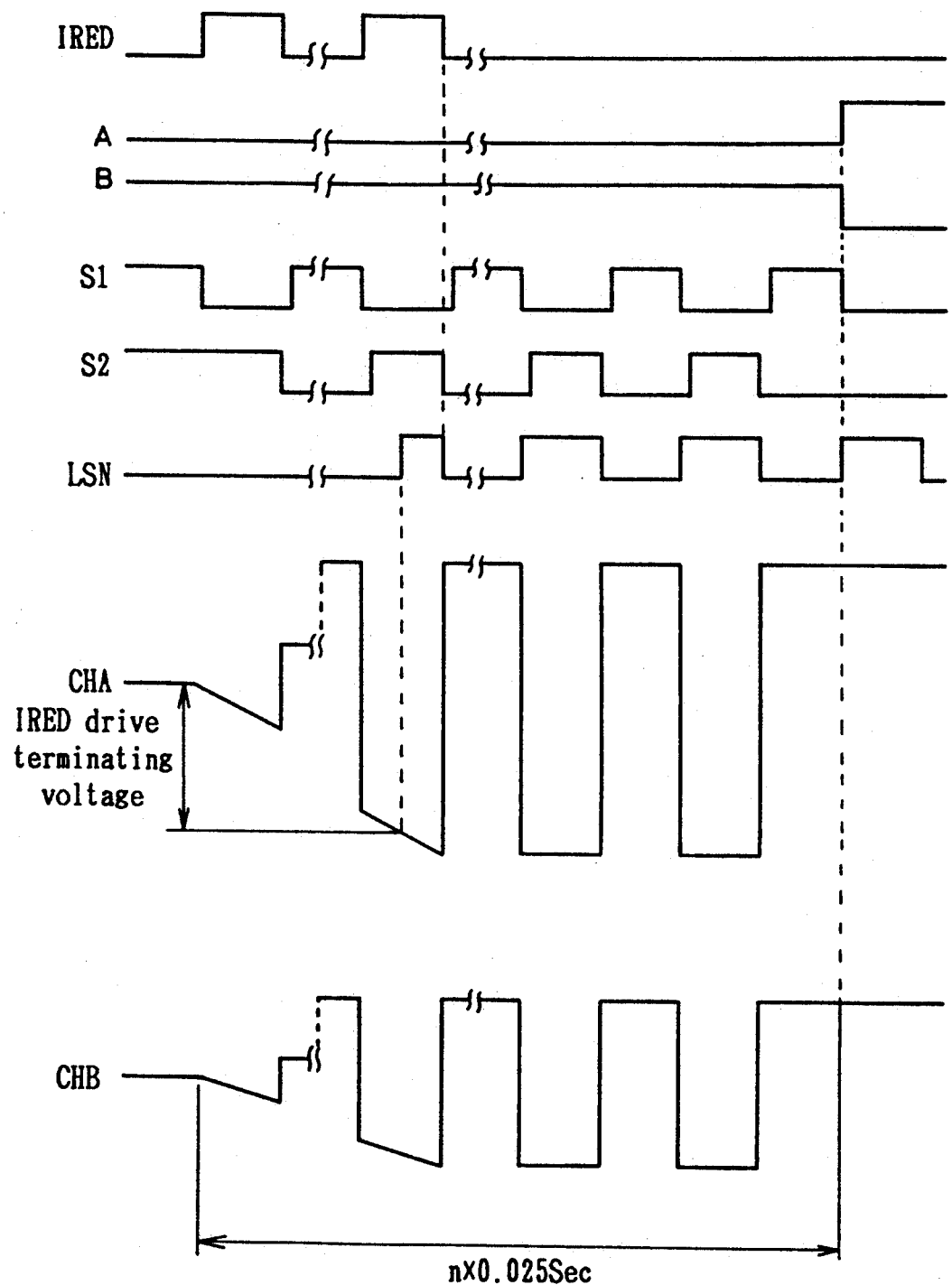
FIG. 3 is a voltage waveform time chart sequentially illustrating the operation of extrinsic light elimination.

The signal voltage having passed through the chopper integrating circuit 12 is then held by the hold circuit 13 and thereafter applied to the comparator 14 after is has been appropriately amplified. The comparator 14 compares the signal voltage with the reference voltage and applies the IRED drive terminating signal to the CPU 17 when a value of the voltage held by the hold circuit 13 exceed the value of the reference voltage. Referring to the time chart of FIG. 3 illustrating operation of extrinsic light elimination, upon reception of the light emission frequency control signal from the CPU 17, the IRED drive circuit 18 begins to drive the light emitter 10 to project the signal light onto the object with the light emission period of 0.025 * 1/m sec. as indicated by IRED in FIG. 3.

The chopper period of the chopper integrating circuit 12 is synchronous with the light emission period and ON signal is generated from each terminal S1, S2 synchronously with the light emission period. When the voltage (CHA, CHB) held by the hold circuit 13 exceeds the reference voltage, the IRED drive terminating signal LSN is generated from the comparator 14 so as to terminate the light emission pulse IRED from the light emitter 10.

The chopper integration continues until the period of integration (0.025 * n sec.) elapses in the chopper integrating circuit 12. After this period of chopper integration has elapsed, generation of ON signal at the terminals S1, S2 is stopped and an ON signals generated at the terminal A while the output from the terminal B is switched from the ON signal to an OFF signal. More specifically, the change-over switch 20 which has been kept closed by the ON signal applied from the terminal B and thereby establishes a short-circuit between the output terminal of the operational amplifier 12c and the positive input terminal of the operational amplifier 13a included in the hold circuit 13 is now opened by the OFF signal applied from the terminal B. As a consequence, the output voltage from the operational amplifier 12c is no more available for the hold circuit 13 and further operation of the chopper integrating circuit 12 is disabled.

Upon reception of the ON signal applied from the terminal A, the switches 21, 22 which have been in their opened positions are closed again, completing a circuit coupling the reference voltage Vc to the positive input terminal of the operational amplifier 13a included in the hold circuit 13 via the capacitor 15 which is now used exclusively as the voltage holding capacitance associated with the hold circuit 13. It will be apparent that the capacitor 15 serves both for the chopper integrating circuit 12 and for the hold circuit 13 but, after operation of the chopper integrating circuit 12 has terminated, serves exclusively for the hold circuit 13.

The change-over switch 20 is connected to the positive input terminal of the operational amplifier 13a included in the hold circuit 13 so that the chopper integrating circuit 12 and the hold circuit 13 can be alternately activated by selectively opening or closing the change-over switch 20 and the switches 21, 22. Accordingly, voltage applied to the positive input terminal of the operational amplifier 13a drops due to resistance inherent in the change-over switch 20 or the switches 21, 22. However, the normally closed load switch 16 which is similar to the change-over switch 20 and connected to the negative input terminal of the operational amplifier 13a causes voltage applied to this negative input terminal also to drop so that this voltage drop may balance with the voltage drop occurring on the positive input terminal. In this manner, an influence of the change-over switch 20 can be alleviated and thereby an error possibly appearing in operation of the hold circuit 13 can be reduced.

The CPU 17 conventionally performs a series of relative operations to determine the distance to the object.

Finally, it should be understood that the presently preferred embodiment has been described hereinabove merely for the purpose of illustration and this invention is not limited to such embodiment.

What is claimed is:

1. An extrinsic light eliminator for an autofocusing circuit comprising:
    a light emitter for projecting a signal light;
    a photodetector for detecting light reflected on an object to be photographed as the corresponding photocurrent for determining the distance to the object; and
    extrinsic light eliminator means comprising a chopper integrating circuit incorporated in the autofocusing circuit for converting the photocurrent to a corresponding voltage and simultaneously amplifying this voltage before it is outputted therefrom, said extrinsic light eliminator means further including a hold circuit coupled to said chopper integrating circuit to hold the output voltage of said chopper integrating circuit, and wherein a capacitor is selectively coupled in said chopper integrating circuit and said hold circuit whereby said capacitor serves both as the integrating capacitance for the chopper integrating circuit and the voltage holding capacitance for the hold circuit;

2. The extrinsic light eliminator for an autofocusing circuit as defined in claim 1, wherein said chopper integrating circuit includes an amplifier directly connected to said photodetector.

3. The extrinsic light eliminator for an autofocusing circuit as defined in claim 1, wherein said chopper integrating circuit consists essentially of an amplifier, said capacitor, and a plurality of switches.

4. The extrinsic light eliminator for an autofocusing circuit as defined in claim 3, wherein said holding circuit consists essentially of an amplifier, said capacitor, and a plurality of switches.

5. The extrinsic light eliminator for an autofocusing circuit as recited in claim 1 and further including a change-over switch coupled to said capacitance to change over the function of the capacitance so that the capacitance serves as the integrating capacitance during operation of the chopper integrating circuit and, upon completion of this operation, serves as the voltage holding capacitance for the hold circuit.

6. The extrinsic light eliminator for an autofocusing circuit as recited in claim 5 and further comprising a load switch provided in a feedback loop of the hold circuit; and wherein the load switch is normally closed during operation of the autofocusing circuit.

7. An extrinsic light eliminator for an autofocusing circuit comprising:
    a light emitter for projecting a signal light;
    a photodetector for detecting light reflected on an object to be photographed as the corresponding photocurrent for determining the distance to the object; and extrinsic light eliminator means comprising a chopper integrating circuit incorporated in the autofocusing circuit for converting the photocurrent to a corresponding voltage and simultaneously amplifying this voltage before it is outputted therefrom, wherein an operating period of the chopper integrating circuit is set to 0.025 sec. multiplied by an integer.

8. An extrinsic light eliminator for an autofocusing circuit comprising:

a light emitter for projecting a signal light;

a photodetector for detecting light reflected on an object to be photographed as the corresponding photocurrent for determining the distance to the object; and extrinsic light eliminator means comprising a chopper integrating circuit incorporated in the autofocusing circuit for converting the photocurrent to a corresponding voltage and simultaneously amplifying this voltage before it is outputted therefrom, wherein an operating period of the chopper integrating circuit is set to 1/240 sec. multiplied by an integer.

* * * * *

UNITED STATES PATENT AND TRADEMARK OFFICE
CERTIFICATE OF CORRECTION

PATENT NO. : 5,285,233
DATED : February 8, 1994
INVENTOR(S) : Hideo Yoshida and Minoru Ishiguro It is certified that error appears in the above-indentified patent and that said Letters Patent is hereby corrected as shown below:

```
Column 2, line 35:
    After "therefrom" insert --.--.

Column 4, line 11:
    "light emitter lo" should be
    --light emitter 10--.

Column 4, lines 24, 25, 29, and 32:
    "a" should be --a--.

Column 4, lines 28, 31, and 34:
    "b" should be --b--.

Column 7, line 11:
    "exceed" should be --exceeds--.
```

Signed and Sealed this

Sixth Day of September, 1994

Attest:

BRUCE LEHMAN

*Attesting Officer*     *Commissioner of Patents and Trademarks*